United States Patent
Habbaba

(10) Patent No.: US 11,168,829 B2
(45) Date of Patent: Nov. 9, 2021

(54) MULTIUSE STORAGE AND HOLDING SOLUTION

(71) Applicant: Ford Global Technologies, LLC, Dearborn, MI (US)

(72) Inventor: Aysha Habbaba, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/461,186

(22) PCT Filed: Nov. 22, 2016

(86) PCT No.: PCT/US2016/063399
§ 371 (c)(1),
(2) Date: May 15, 2019

(87) PCT Pub. No.: WO2018/097819
PCT Pub. Date: May 31, 2018

(65) Prior Publication Data
US 2019/0376638 A1    Dec. 12, 2019

(51) Int. Cl.
| | | |
|---|---|---|
| F16M 11/04 | (2006.01) |
| A47B 45/00 | (2006.01) |
| B60R 9/06 | (2006.01) |
| B60R 9/10 | (2006.01) |
| B60R 11/02 | (2006.01) |
| B60P 3/07 | (2006.01) |

(52) U.S. Cl.
CPC ............ *F16M 11/04* (2013.01); *A47B 45/00* (2013.01); *B60R 9/06* (2013.01); *B60R 9/10* (2013.01); *B60R 11/0241* (2013.01); *B60P 3/07* (2013.01)

(58) Field of Classification Search
CPC ........... F16M 11/04; A47B 45/00; B60R 9/06; B60R 9/10; B60R 11/0241; B60P 3/07
See application file for complete search history.

(56) References Cited

U.S. PATENT DOCUMENTS

| | | | | |
|---|---|---|---|---|
| 1,853,261 A * | 4/1932 | Dawson | ................... | B60R 7/08 |
| | | | | 211/89.01 |
| 2,483,043 A * | 9/1949 | Golden | .................. | B60N 3/004 |
| | | | | 297/163 |
| 2,518,989 A * | 8/1950 | Haslup | .................. | B42F 13/406 |
| | | | | 211/69.8 |
| 2,907,507 A * | 10/1959 | Solak | ........................ | G09F 5/02 |
| | | | | 294/148 |
| 4,022,362 A * | 5/1977 | Revercomb | ............... | B60R 9/10 |
| | | | | 224/324 |
| 4,052,805 A * | 10/1977 | Potter | ........................ | G09F 1/10 |
| | | | | 40/124 |
| 4,846,430 A * | 7/1989 | Ke | .......................... | A47G 25/00 |
| | | | | 248/215 |

(Continued)

*Primary Examiner* — Patrick D Hawn
(74) *Attorney, Agent, or Firm* — Brandon Hicks; Eversheds Sutherland (US) LLP

(57) ABSTRACT

A versatile storage system for storing objects of varying sizes comprises a plurality of structural members and a plurality of flexible cords. The flexible cords are attached to at least two of the structural members at an angle substantially normal with the structural members. The structural members are configured to hold the flexible cords taut such that an object may be woven through the flexible cords and stored securely therein.

16 Claims, 9 Drawing Sheets

(56) References Cited

U.S. PATENT DOCUMENTS

| | | | | |
|---|---|---|---|---|
| 4,974,806 A * | 12/1990 | Matern | ............... | A47L 15/505 211/41.9 |
| 5,950,844 A * | 9/1999 | Taylor | ............... | B63B 32/80 211/85.7 |
| 5,988,406 A * | 11/1999 | Leipziger | ............... | A47L 15/505 211/41.9 |
| 6,045,022 A * | 4/2000 | Giles | ............... | B60R 9/06 224/488 |
| 6,212,810 B1 * | 4/2001 | Jones | ............... | G09F 15/0037 160/135 |
| 6,390,309 B1 * | 5/2002 | Tucker | ............... | B63B 32/80 211/85.7 |
| 6,675,977 B2 * | 1/2004 | Parks | ............... | A47L 15/505 211/41.8 |
| 7,963,005 B2 * | 6/2011 | Knox | ............... | A41D 27/08 206/478 |
| 8,152,001 B1 * | 4/2012 | Vinklarek | ............... | A47L 15/505 211/180 |
| 8,636,156 B2 * | 1/2014 | Malik | ............... | A47B 57/04 211/106 |
| 9,918,551 B2 * | 3/2018 | Hilliard | ............... | F16B 2/26 |
| 10,308,301 B2 * | 6/2019 | Walk | ............... | B62J 1/18 |
| 10,334,973 B2 * | 7/2019 | Slevin-Giesler | ... | A47B 96/1425 |
| 10,427,611 B2 * | 10/2019 | Vanderpool | ............... | B60N 3/004 |
| 10,557,227 B2 * | 2/2020 | Felsenthal | ............... | D06F 57/08 |
| 2010/0270246 A1 * | 10/2010 | Rodriguez | ............... | A47B 96/16 211/34 |
| 2012/0267331 A1 * | 10/2012 | Cittadino | ............... | A47F 5/10 211/118 |
| 2012/0292273 A1 * | 11/2012 | Mcnamara | ............... | A47L 15/505 211/79 |
| 2013/0068919 A1 * | 3/2013 | Antonioni | ............... | B60R 11/00 248/614 |
| 2013/0220957 A1 * | 8/2013 | Malik | ............... | A47B 57/04 211/119.004 |
| 2019/0376638 A1 * | 12/2019 | Habbaba | ............... | B60R 11/0241 |
| 2019/0387878 A1 * | 12/2019 | Gaviria | ............... | A47B 96/06 |

* cited by examiner

MULTIUSE STORAGE AND HOLDING SOLUTION

TECHNICAL FIELD

The disclosure relates generally to multiuse storage systems and more particularly relates to systems, methods, and devices for securing objects of varying sizes with a plurality of flexible cords.

BACKGROUND

Consumers continue to seek more efficient, convenient, and versatile ways to store items securely while ensuring the items can be quickly retrieved. It can be particularly important to securely store objects when traveling in, for example, an automotive vehicle, a train, or a bus. Oftentimes, when storing an item in an automotive vehicle, consumers are required to obtain a case or mount specific to the item, and this solution can be expensive and inflexible to accommodating different objects.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
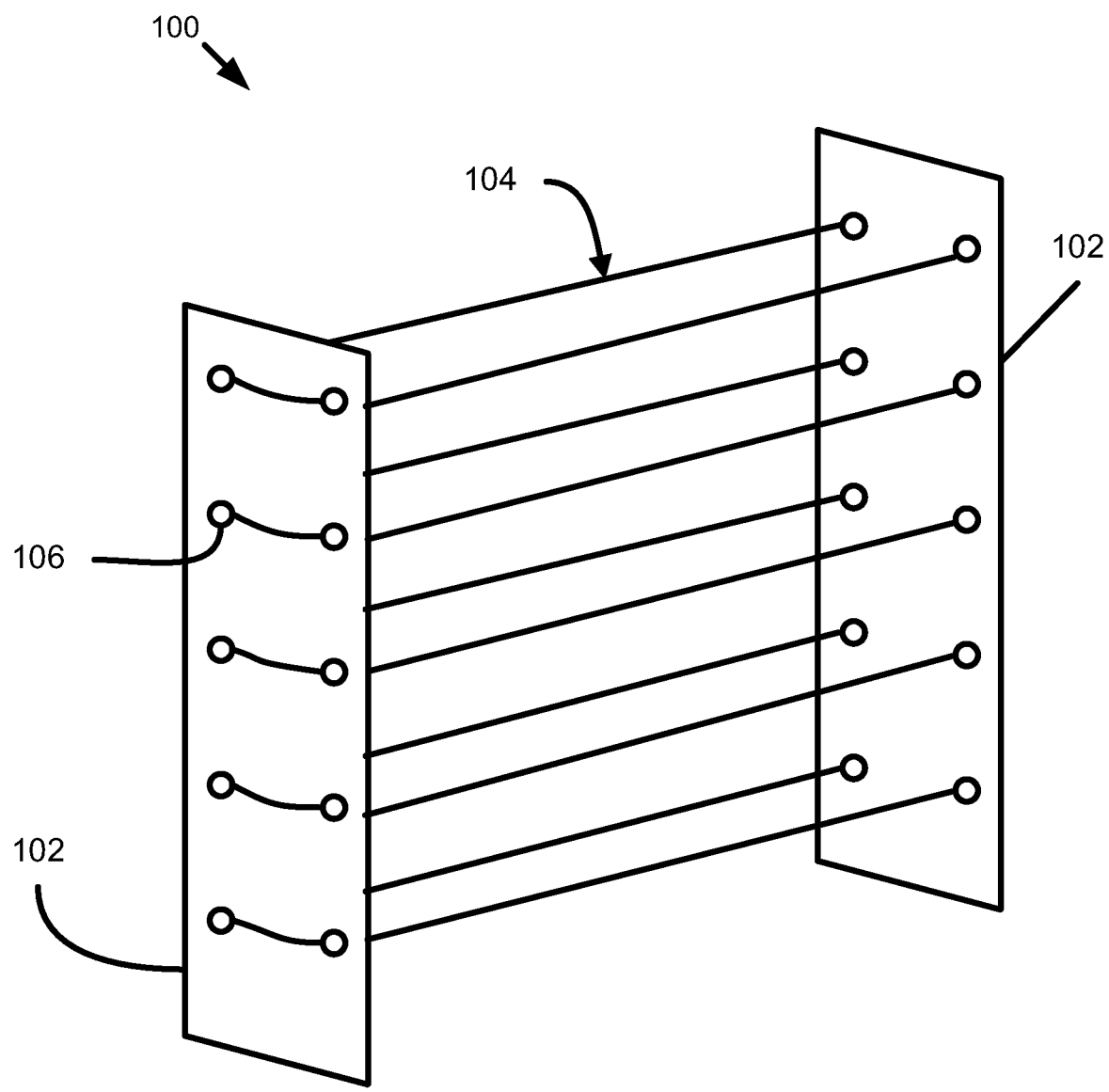
FIG. 1 illustrates a perspective view of a versatile storage system, according to one implementation.

Applicants have recognized the need for and developed significant improvements to systems, methods, and devices for securely storing objects for quick retrieval. For example, consumers wishing to store an object when traveling may be required to obtain a case or a mount for the specific item, and this solution can be expensive and inflexible to accommodating other objects. Persons wishing to store an item on public transportation, such as a bicycle or skateboard, may be required to stand with the item and hold it while traveling. This can be cumbersome and uncomfortable and it may cause congestion within the vehicle or train. This is a problem because travelers do not have a convenient and secure system for storing items of varying shapes and sizes.

In light of the foregoing, applicants have developed a versatile storage system comprising a plurality of flexible cords strung between at least two structural members such that the storage system can securely store objects of many shapes and sizes. In one embodiment, the storage system includes a plurality of structural members and a plurality of flexible cords. The flexible cords may be strung between at least two structural members such that the flexible cords are taut. An object may be woven between the flexible cords and stored securely therein. A consumer can quickly and conveniently adjust the position of the structural members, the length of the flexible cords, and tension in the flexible cords, and the position of the flexible cords. The storage system is versatile and customizable such that a user can securely store a variety of different objects and provide for the efficient retrieval of those objects.

In one embodiment, the structural members may be rectangular posts. The flexible cords may be attached to the posts in side-by-side pairs such that a pair of flexible cords may secure the object. The pairs of flexible cords may be attached to the structural members along the vertical length of the structural members. In one embodiment, the structural members are panels or bases. In a further embodiment the structural members are bars. In a further embodiment the structural members form a curved shape and can form any shape as desired by a user. In one embodiment, the structural members comprise a plurality of holes that may receive the flexible cords such that a flexible cord may be attached at the hole. In this embodiment, a user may quickly and conveniently add, remove, or change the position of a flexible cord.

In one embodiment, the storage system is connected to a position-adjusting component. The mount may be attached to, for example, a stationary wall, an interior of a vehicle such as an automotive vehicle or a bus, or an exterior of a vehicle such as a van or a bus. The position-adjusting component may include a plurality of hinged arms and may be connected to the structural members of the storage system. A user may adjust the position and angle of the storage system by engaging the plurality of hinged arms in the position-adjusting component. In one embodiment, the storage system is connected to a position-adjusting component including a mounting component that enables a user to quickly and effectively adjust the distance between the structural members.

Embodiments disclosed herein may allow for increased versatility in storage systems. For example, embodiments disclosed herein may be attached to a public transportation vehicle such that a range of objects may be secured therein, including, for example, a bicycle, a skateboard or long board, a backpack, and a mobile phone. The embodiments disclosed herein may grant increased efficiency and versatility to users wishing to store objects of different sizes and later quickly retrieve those objects.

Further embodiments and examples will be discussed in relation to the figures below.

FIG. 1 illustrates a perspective view of a versatile storage system 100 with two structural members 102. A flexible cord 104 may be attached to the structural members 102 by being strung through holes 106 within the structural members 102. The flexible cord 104 may be a continuous circular cord, wherein the cord is strung through a hole 106 and strung back through an additional hole 106 on the same structural member 102 and in the opposite direction. The flexible cord 104 may be strung through additional holes 106 on an additional structural member 102 and connected to the opposite end of the cord 104 such that the flexible cord 104 forms a continuous circle.

The structural members 102 may be positioned such that the flexible cord 104 is pulled taut. The distance between at least two structural members 102 may be adjusted such that the tension of the flexible cord 104 can be adjusted to accommodate objects of varying shapes and sizes. A user may secure an object in the storage system 100 by weaving an object through the flexible cords 104.

The structural member may be constructed of any suitable rigid material and may be constructed in any suitable shape. The structural member may be constructed of, for example, metal, wood, or plastic. The structural member may include a post-like shape, a flat panel shape, it may be curved to accommodate any shape as desired by the user, and it may be telescoping such that the length of the structural member can be quickly adjusted.

The flexible cord may be constructed of any suitable material that is both strong and flexible. The flexible cord may be constructed of, for example, silicone, rubber, or flexible rope. The flexible cord may form lengths of cord or it may comprise continuous circular cord that is attached at each end. In one embodiment the flexible cord may include an end-to-end attachment component such that the opposite ends of the cord may be attached and the flexible cord may form a continuous circle. The end-to-end attachment component may include, for example, a hook and a loop, a lock, two loops and a separate lock, or an adhesive.

The structural members may include a plurality of holes in different positions such that a user may quickly add, remove, or reposition a flexible cord by moving the flexible cord from one hole to a different hole. The holes may include, for example, a clip to attach the flexible cord at the hole. In one embodiment, the flexible cord comprises a rigid bar at the end of the cord such that the rigid bar my pass through the hole and then span the distance of the hole to secure the flexible cord at the hole. In one embodiment, the flexible cord may be passed through a plurality of holes and then attached at each end such that the flexible cord forms a continuous circular cord.

Figure 2:
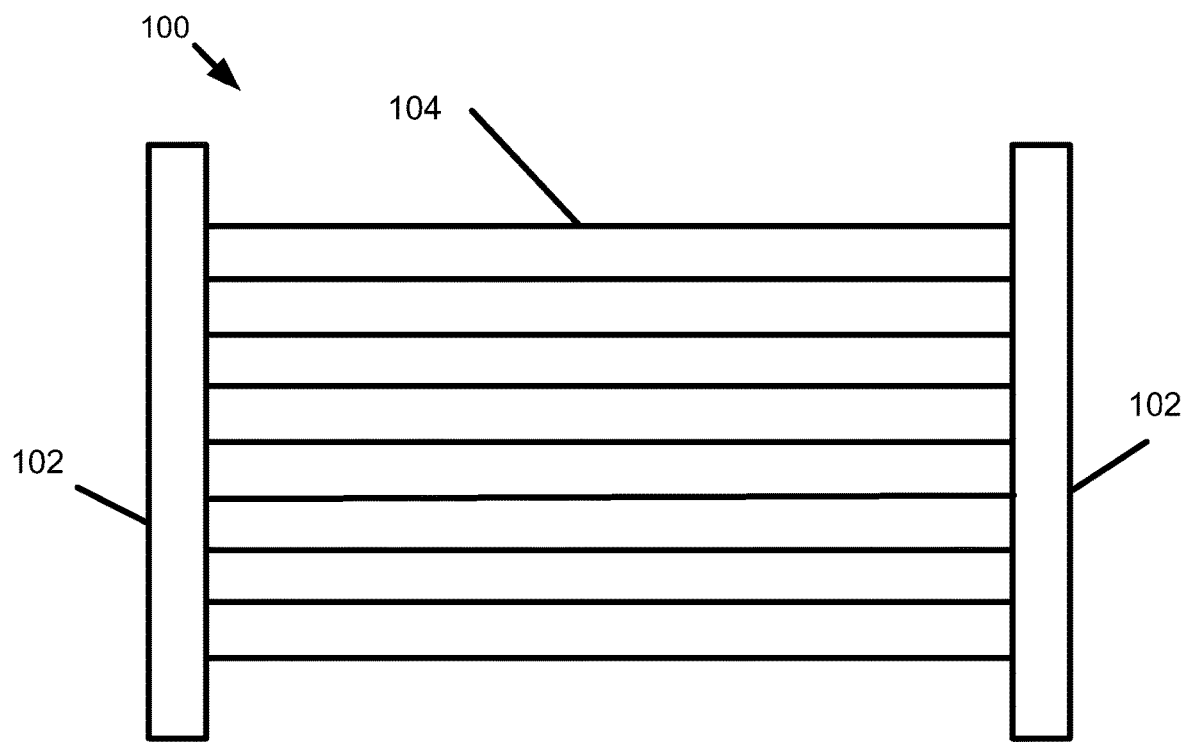
FIG. 2 illustrates a front view of a versatile storage system, according to one implementation.

FIG. 2 illustrates a front or rear view of a versatile storage system 100. The storage system 100 may include a plurality of flexible cords 104 attached along the vertical distance of the structural members 102. The flexible cords 104 may be attached at a degree normal to the structural members 102 when pulled taut. In one embodiment, the system includes a plurality of flexible cords 104 attached equidistant to one-another along the vertical length of the structural members 102. In another embodiment, the system includes a plurality of flexible cords 104 attached at varying distances to one another along the vertical length of the structural members 102. In one embodiment, a user may adjust the positions of the flexible cords 104 such that the storage system may be customized to secure a particular object.

Figure 3:
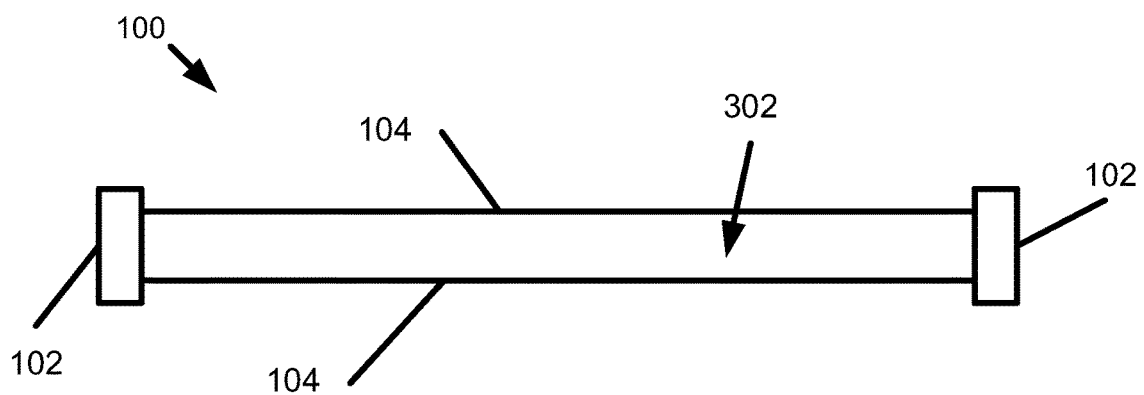
FIG. 3 illustrates an aerial view of a versatile storage system, according to one implementation.

FIG. 3 illustrates an aerial view of a versatile storage system 100. In one embodiment the plurality of flexible cords 104 may be attached to the structural members 102 to form vertical columns such that an interior space 302 is formed between the flexible cords 104. In one embodiment the flexible cords 104 are attached in pairs such that the pairs of cords are attached at an equal distance from an end of a structural member. This embodiment may improve the storage security when an object is placed in the interior space 302 between the pairs of cords. In one embodiment the flexible cords 104 are attached at varying distances from an end of a structural member. This embodiment may improve the storage security when an object is woven between the flexible cords. In one embodiment the pairs of flexible cords 104 forming the interior space 302 are equidistant along the vertical length of the structural member. In one embodiment the pairs of flexible cords 104 forming the interior space 302 are of varying distances from one another. This embodiment may be particularly useful to accommodate a particular shape. For example, the pairs of flexible cords may be nearer to each other at the bottom end of the structural members and farther from each other at the top end of the structural members to particularly accommodate an object having a tapering shape. The object may be placed in the interior space 302 and secured by the plurality of pairs of flexible cords 104.

Figure 4:
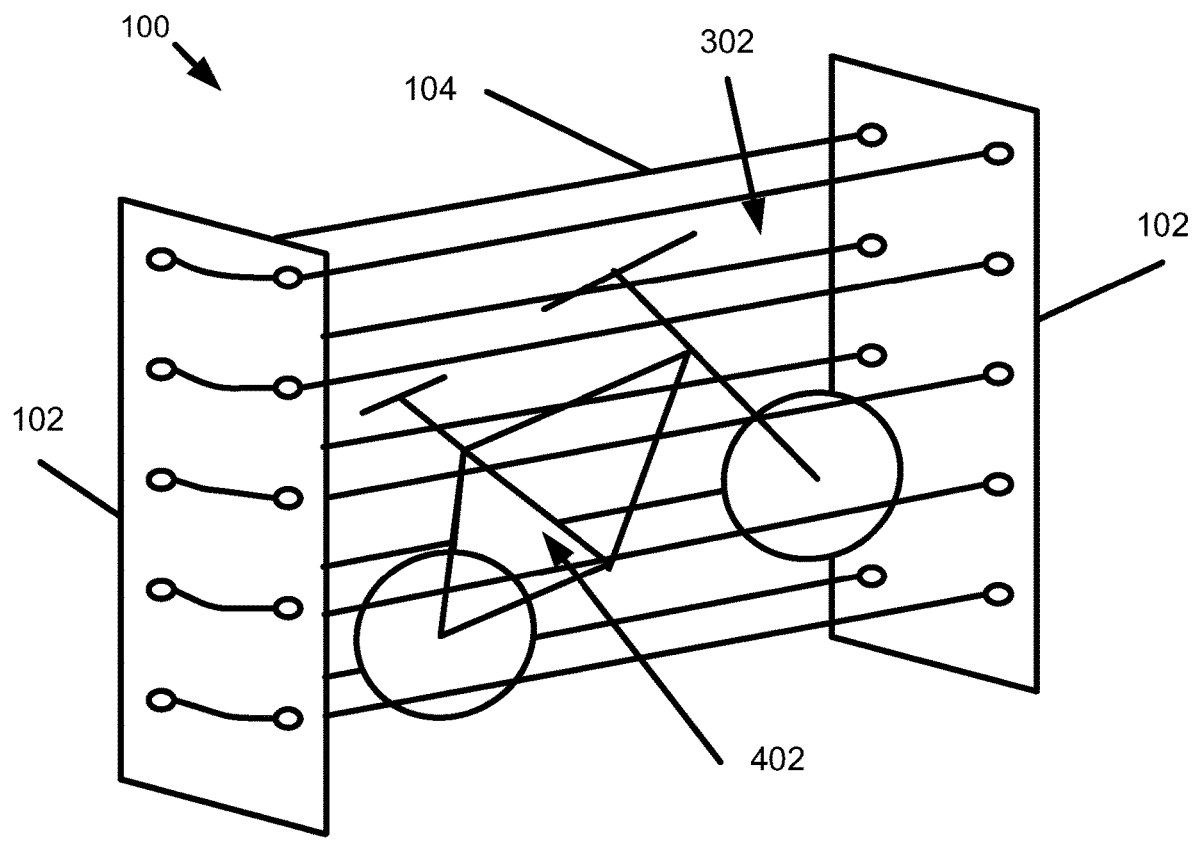
FIG. 4 illustrates a perspective view of a versatile storage system with an object stored therein, according to one implementation.

FIG. 4 illustrates a perspective view of a versatile storage system 100 with a bicycle 402 stored therein. As depicted in the figure, the bicycle may be placed in the interior space 302 between the pairs of flexible cords 104 attached along the vertical lengths of the structural members 102. Components of the bicycle 402 or other object may also be woven through the flexible cords 104. For example, the handlebars of a bicycle 402 may protrude outside the versatile storage system 100 or be woven in and out of the flexible cords, while the frame of the bicycle 402 is secured in the interior space 302. It should be appreciated that the versatile storage system 100 may be constructed in any size or shape necessary to accommodate different objects. In one embodiment the storage system may accommodate a plurality of bicycles. In one embodiment the storage system may not accommodate a bicycle but may accommodate, for example, a briefcase or purse.

Figure 5:
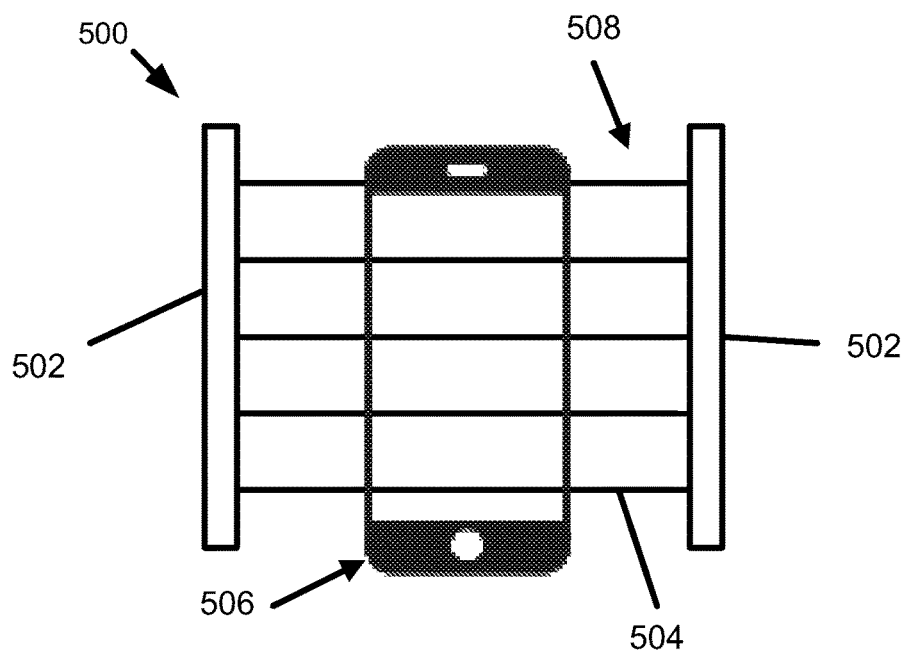
FIG. 5 illustrates a front view of a versatile storage system with an object stored therein, according to one implementation.

FIG. 5 illustrates a front view of a versatile storage system 500 with a mobile phone 506 stored therein. In one embodiment an object, such as a mobile phone, may be secured by the interior space 508 between pairs of flexible cords 504 attached along a vertical distance of at least two structural members 502. In one embodiment the storage system may include a single vertical line of flexible cords such that an object, such as a mobile phone, may be secured by weaving the object through the flexible cords 504. It should be appreciated that the versatile storage system 500 may be constructed in any size or shape necessary to accommodate different objects. In one embodiment the storage system may accommodate, for example, a mobile phone, a wallet, keys, and other small objects. In one embodiment the storage system may be custom-fit to secure a particular mobile phone.

Figure 6:
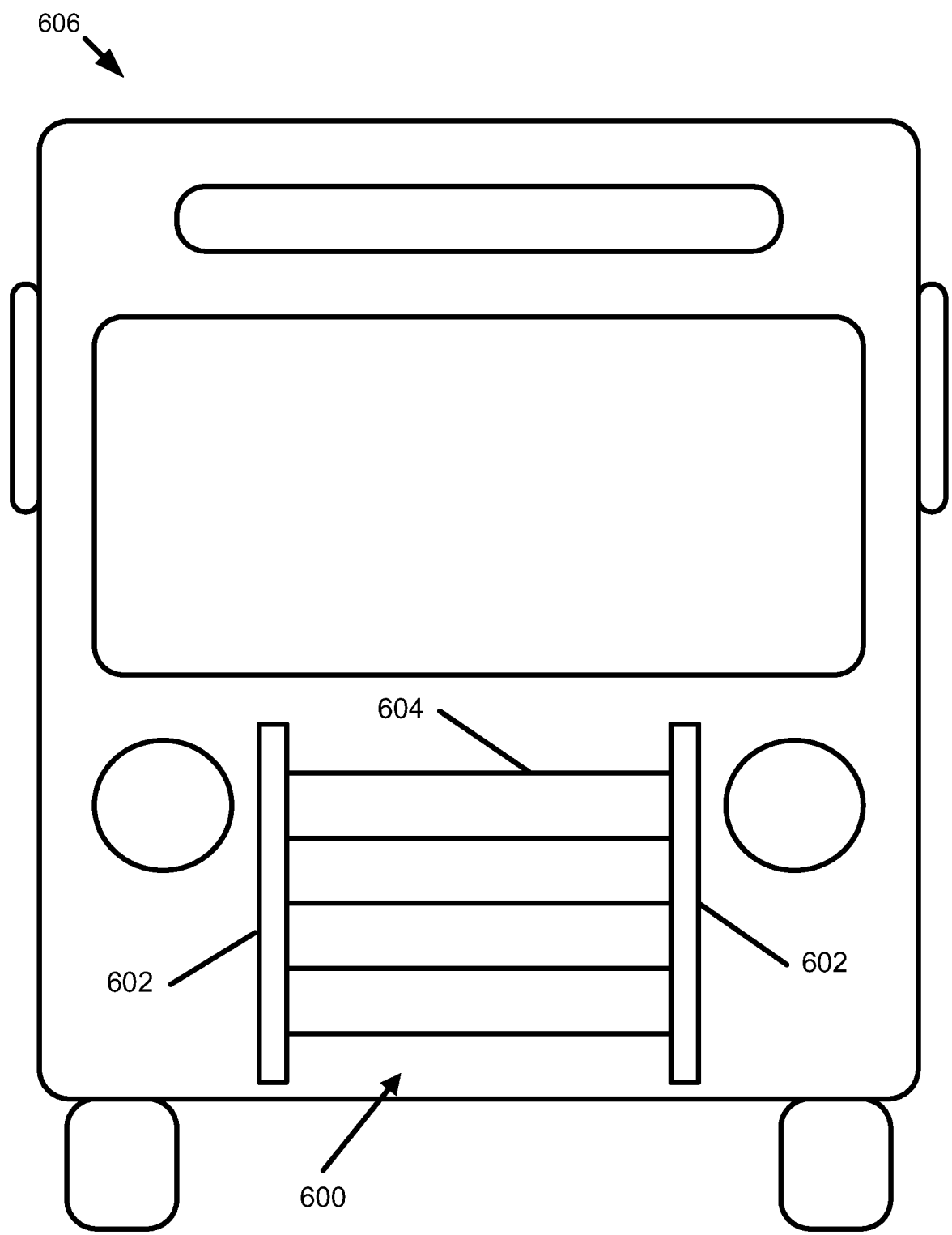
FIG. 6 illustrates a front view of a versatile storage system mounted to a vehicle, according to one implementation.

FIG. 6 illustrates a front view of an automotive vehicle 606 with a versatile storage system 600 attached to the exterior of the vehicle. It should be appreciated that the storage system 600 may be attached to any surface. The system may be attached to, for example, a stationary wall, an interior of a vehicle or other transportation system, an exterior of a vehicle or other transportation system, a floor, or it may be freestanding. In one embodiment the structural members 602 are attached to an exterior of a vehicle and a plurality of flexible cords 604 are attached to create a plurality of interior spaces (such as the interior space 302 of FIG. 3) to accommodate, for example, bicycles, skateboards, and long boards.

Figure 7:
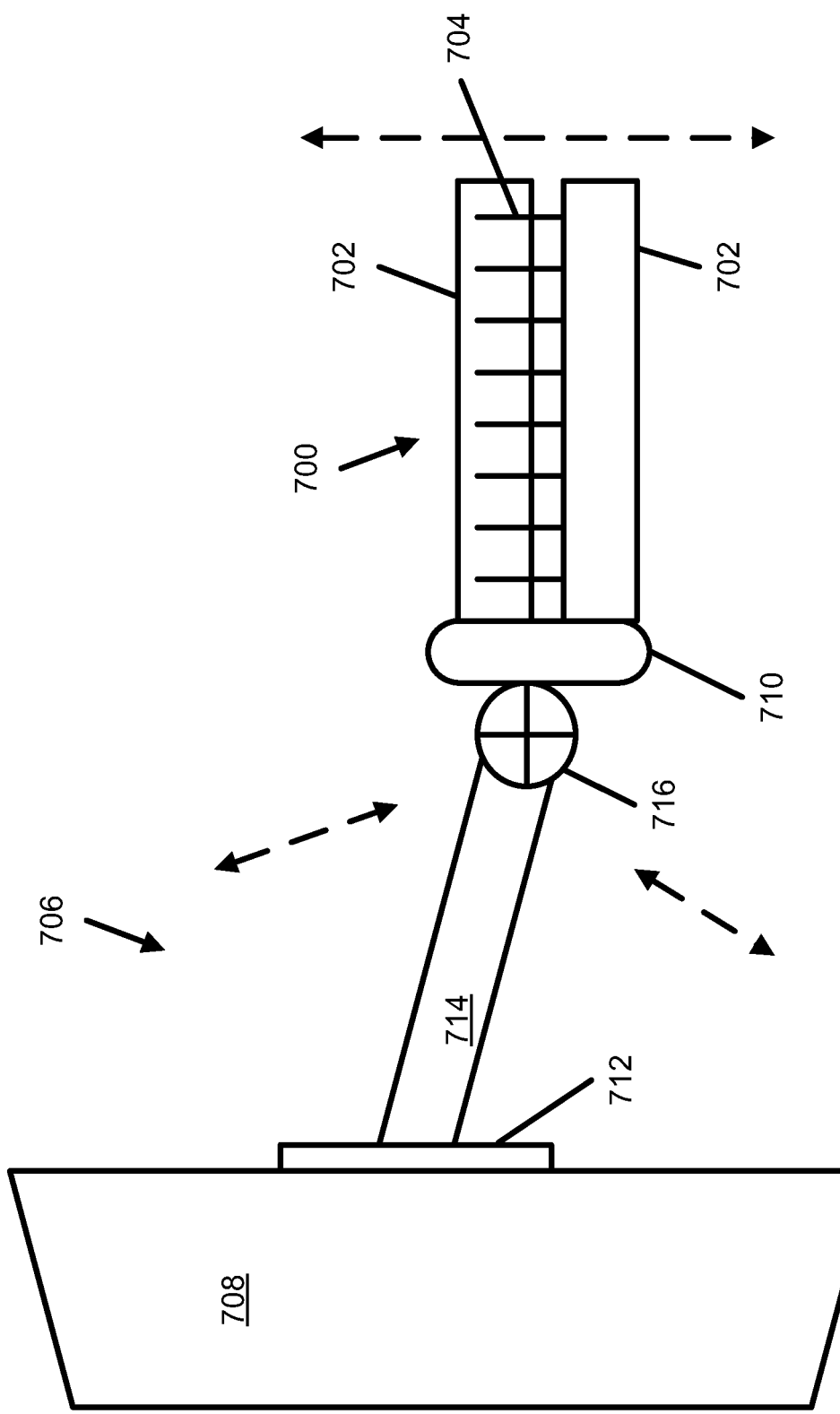
FIG. 7 illustrates a perspective view of a versatile storage system mounted to a position-adjusting component, according to one implementation.

FIG. 7 illustrates a versatile storage system 700 attached to a position-adjusting component 706 according to one embodiment of the invention. The position-adjusting component 706 may include a mounting plate 708 for securing the position-adjusting component 706 to, for example, a wall or an automotive vehicle. It may include a pivot component 712 for attaching an arm 714 to the mounting plate 708. The pivot component 712 may enable the arm 714 to hinge, for example, up or down or to either side. The pivot component may include, for example, a bi-fold hinge, a butt hinge, a continuous hinge, a flag hinge, a knife hinge, a barrel hinge, an invisible hinge, or any other suitable pivot connection known in the art. The position-adjusting component 706 may include an angle adjustment component 716 for manipulating the angle of the storage system 700 with respect to mounting plate 708. The angle adjustment component 716 may be attached to a mounting component 710 for the versatile storage system 700. The versatile storage system 700 may be attached to the mounting component 710. As depicted in FIG. 7, the vertical ends of the structural members 702 may be attached to the mounting component 710. Alternatively, the length of the structural members 702 may be attached to the mounting component 710 for a vertical orientation of the structural members 702. In one embodiment, the versatile storage system 700 may be attached to the position-adjusting component 706 such that the tension in the flexible cords 704 may be adjusted by moving the position of at least one of the structural members 702.

Figure 8:
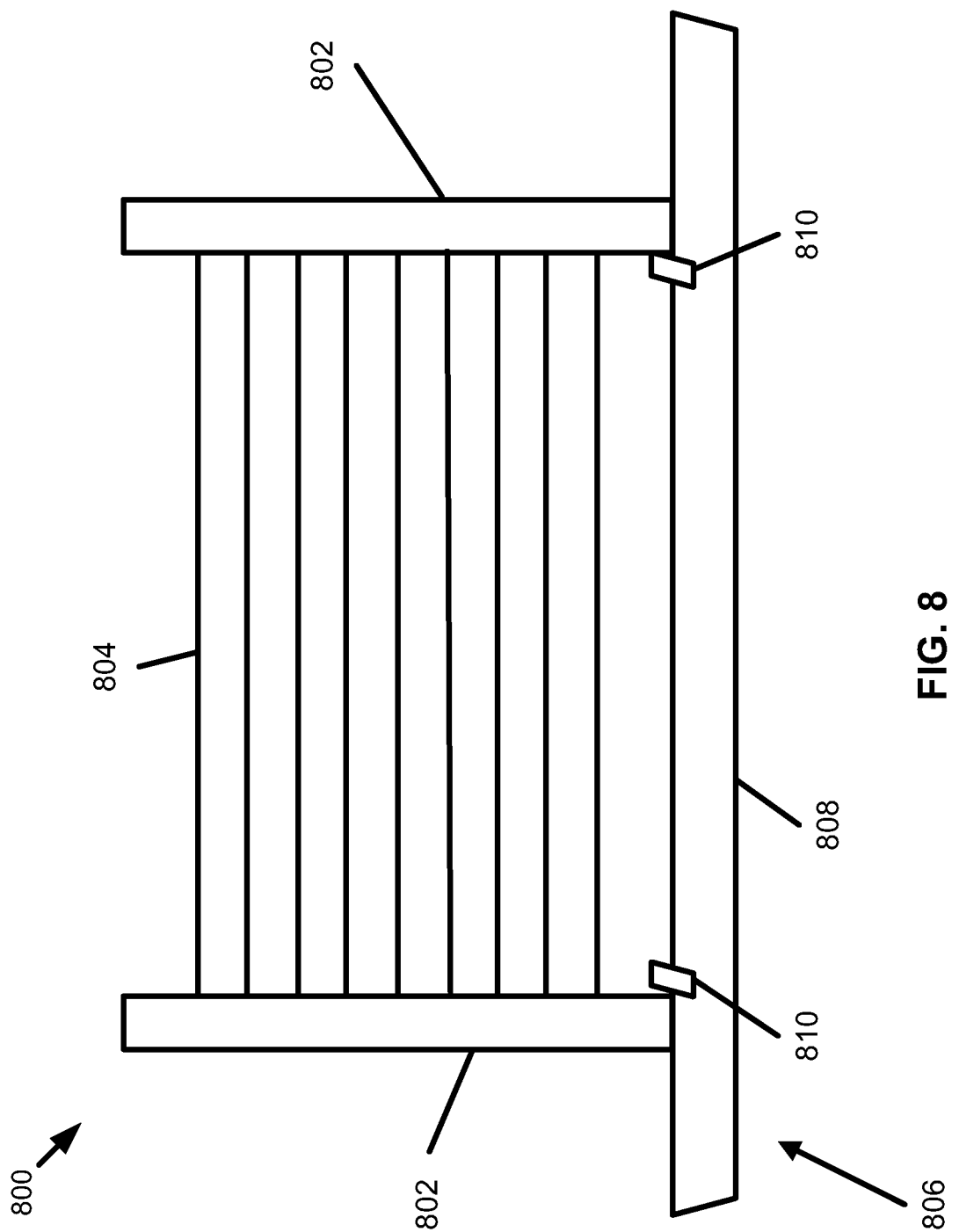
FIG. 8 illustrates a front view of a versatile storage system mounted to a position-adjusting component, according to one implantation.

FIG. 8 illustrates a versatile storage system 800 attached to a position-adjusting component 806 according to one embodiment of the invention. The position-adjusting component 806 may include a track or mounting component 808 that may receive and hold the structural members 802. The track or mounting component 808 may further include positions locks 810 for maintaining a desired distance between the structural members 802. The locks 810 may secure the structural members 802 in a desired position on the mounting component 808. The locks 810 may comprise, for example, screws that drive through the mounting component 808 and through the structural members 802. The locks 810 may comprise a plate attached to the end of the structural member 802 and secured to the mounting component 808. A user may move the structural members 802 along the track or mounting component 808 to adjust the tension in the flexible cords 804.

Figure 9:
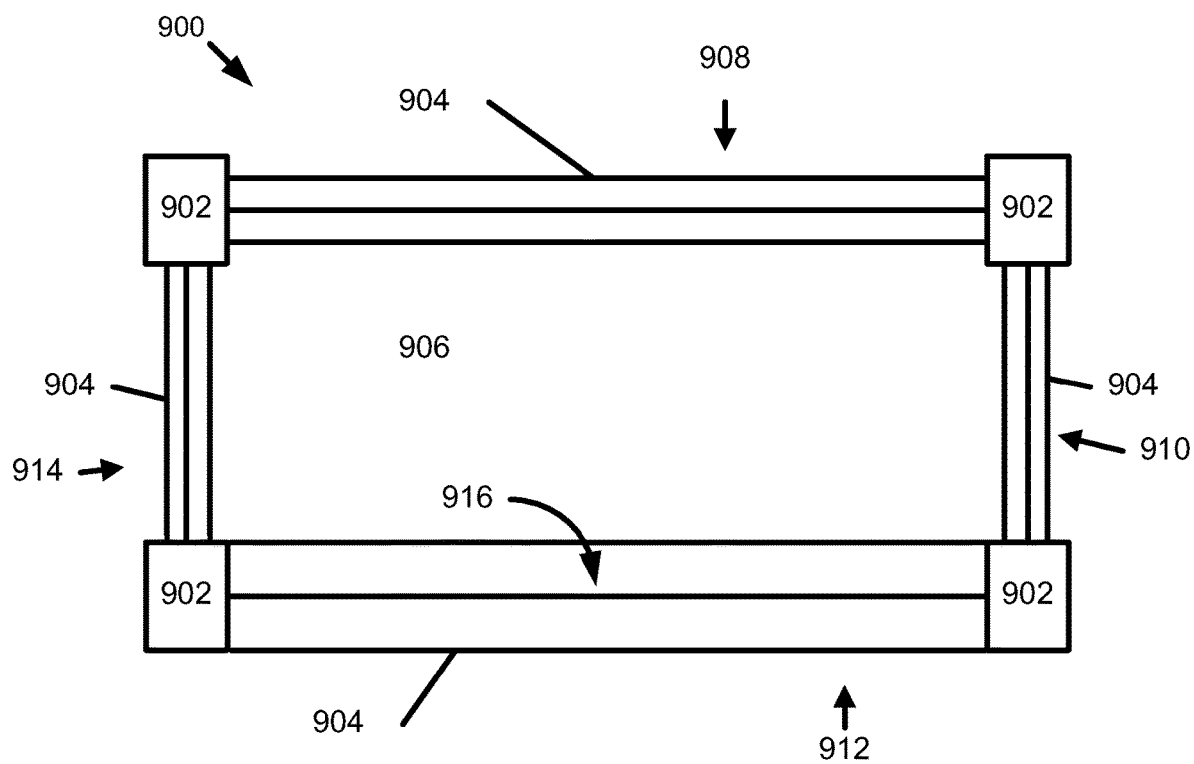
FIG. 9 illustrates an aerial view of a versatile storage system according to one implementation.

FIG. 9 illustrates an aerial view of a versatile storage system 900 according to one implementation. As shown, the storage system may include a plurality of structural members 902, including more than two structural members. FIG. 9 depicts four structural members 902 arranged in a rectangle with an empty space 906 in the interior of the storage system 900. It should be appreciated that any number of structural members may be used to form any number of shapes. A plurality of flexible cords 904 is attached to each of the structural members 902. FIG. 9 depicts four storage system units 908, 910, 912, and 914 with each unit including three columns of flexible cords 904 attached along the vertical lengths of the structural members 902. It should be appreciated that, while the accompanying figures have depicted wherein a storage system unit includes two columns (FIGS. 1, 2, 4, and 7) and three columns (FIG. 9), a storage system may have any number of vertical columns of flexible cords attached along the vertical length of a structural member. An interior space 916 is formed between every pair of vertical columns of cords, and an object may be placed in and secured within an interior space 916. Also as depicted in FIG. 9, the distance between vertical columns of cords may vary, thereby varying the size of the interior space 916 wherein an object may be secured. Further, the flexible cords 904 do not need to be attached to the structural member in a straight vertical column. The flexible cords 904 may be attached to the structural member in any location necessary for securing a particular object.

Figure 10:
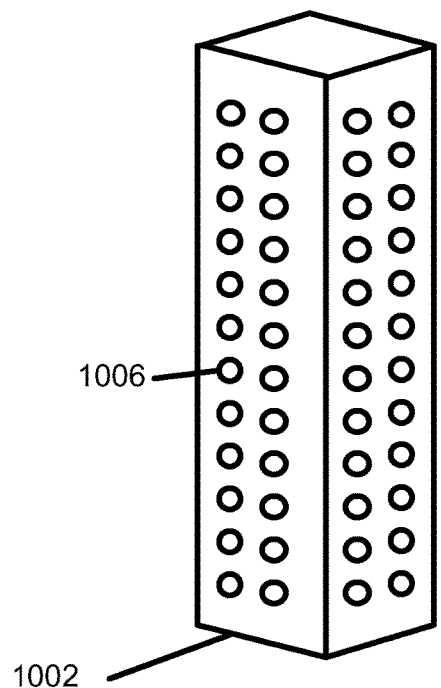
FIG. 10 illustrates a front view of a structural member according to one implementation.

FIG. 10 illustrates a structural member 1002 according to one embodiment of the invention. For example, the structural member 102 or similar configuration may be used in place of any of the structural members discussed herein, such as FIG. 9. The structural member 1002 may include a plurality of holes 1006 such that a flexible cord may be strung through any of the holes 1006 and thereby attached to the structural member. The flexible cord may attached at the hole with, for example, a knot, a clip, a fastener, or a rigid rod that may pass through the hole and then span the distance of the hole such that the flexible cord is securely attached at the hole. The flexible cord may be attached at a hole such that a user may quickly add, remove, or reposition the flexible cords in the structural member. For example, a person may remove and reattach a flexible cord when securing an object. A user may arrange a plurality of flexible cords to accommodate an object of a particular size. A user may arrange a plurality of flexible cords to accommodate a plurality of objects having different sizes. Alternatively, the flexible cord may be attached to a structural member without a hole.

As depicted in FIG. 10, the structural member may be a rigid post. Alternatively, the structural member 1002 may be a flat base of any suitable shape, a rod, or any other suitable shape. The structural member 1002 may be constructed of any suitable rigid material, including metal, wood, or plastic. The structural member 1002 may have a telescoping structure such that the length of the structural member 1002 may be quickly adjusted. A structural member 1002 may have at least one hole 1006 in any location on the structural member 1002. A structural member 1002 may have a plurality of holes such that a flexible cord may be attached at many different locations at the structural member 1002. This ensures a storage system has great versatility to accommodate objects of different shapes and sizes.

Figure 11:
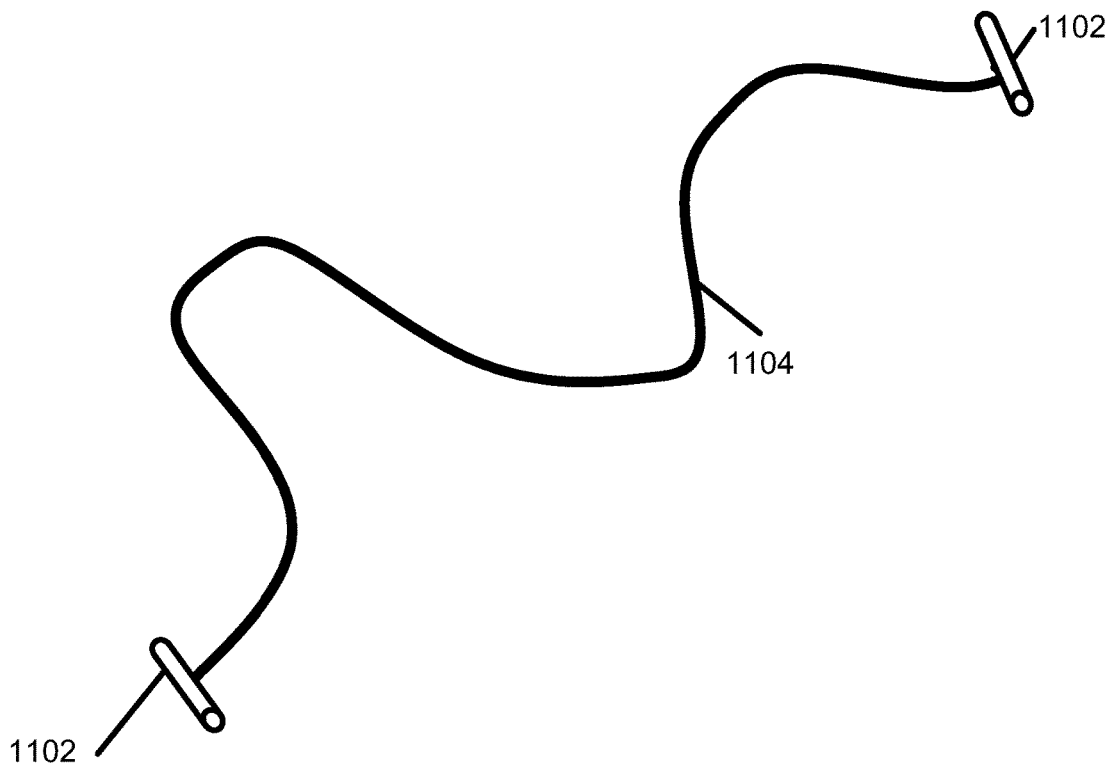
FIG. 11 illustrates an aerial view of a flexible cord according to one implementation.

FIG. 11 illustrates a flexible cord 1104 according to one embodiment. The flexible cord 1104 may include an attachment component 1102 attached at either end of the flexible cord 1104. As depicted in FIG. 11, the attachment component 1102 may include a rigid rod attached to the end of the flexible cord 1104 at an angle substantially normal with the flexible cord 1104. The flexible cord 1104 may be flexible such that the rigid rod may pass through a hole in a structural member, and the flexible cord 1104 may then be straightened such that the rigid rod spans the length of the hole and holds the flexible cord 1104 at the hole. Alternatively, the attachment component 1102 may include a hook in one embodiment. The attachment component 1102 may include a knot in one embodiment, wherein the knot is tied after the flexible cord 1104 is passed through the hole, and the knot spans the length of the hole such that the flexible cord 1104 is held at the hole. The attachment component 1102 may include an adhesive in one embodiment.

Figure 12:
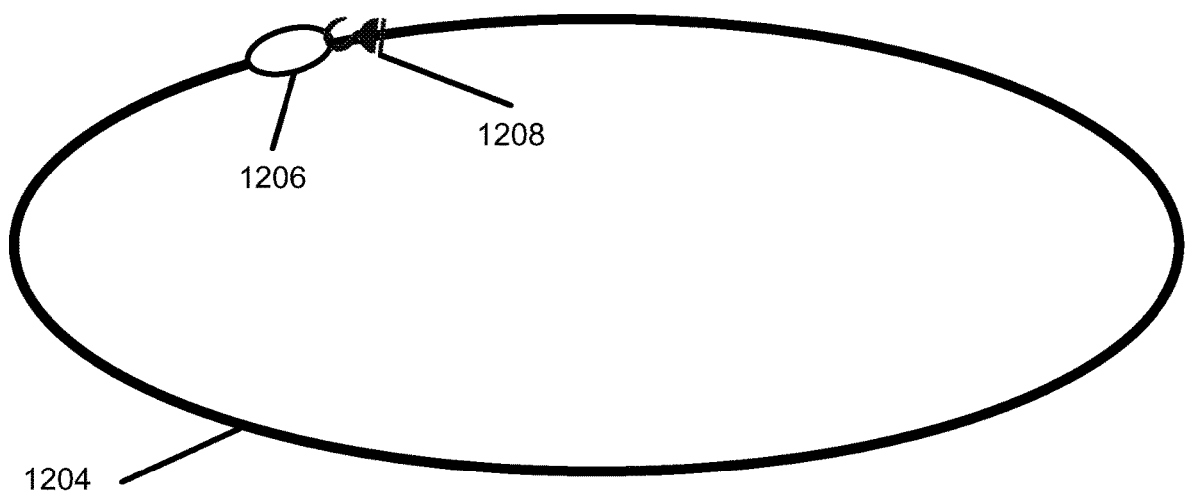
FIG. 12 illustrates an aerial view of a flexible cord according to one implementation.

FIG. 12 illustrates an end-to-end attachment component 1206 and 1208 for a flexible cord 1204 according to one embodiment. The end-to-end attachment component may include a loop 1206 attached to a first end of a flexible cord 1204 and a hook 1208 attached to a second end of a flexible cord 1204. The hook 1208 may lock into the loop 1206 and hold the flexible cord 1204 in a continuous circular configuration. Alternatively, the end-to-end attachment component may include, for example, a loop attached to both ends of the flexible cord and a lock configured to hold the loops together, a knot, or an adhesive.

Figure 13:
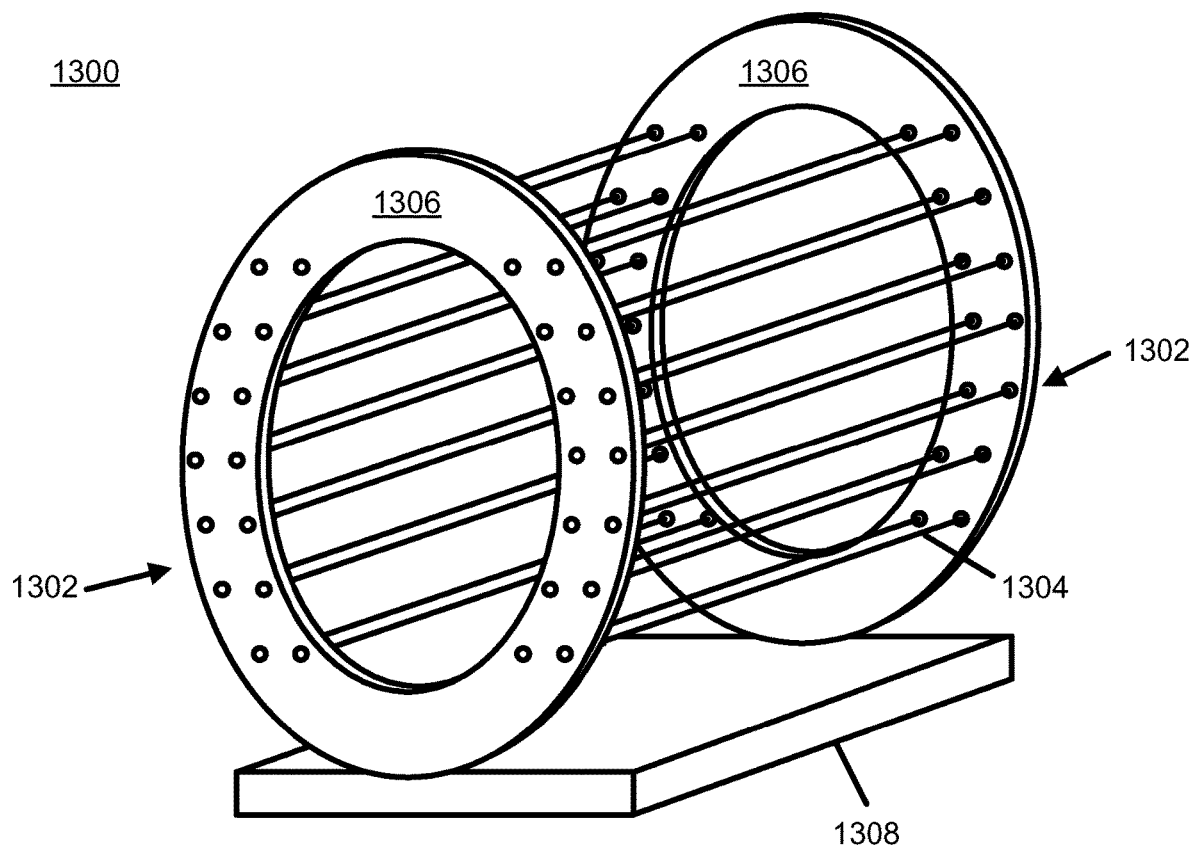
FIG. 13 illustrates a perspective view of a versatile storage system according to one implementation.

FIG. 13 illustrates an embodiment of a versatile storage system 1300 that includes structural members 1302 and a plurality of flexible cords 1304 strung between the structural members 1302. As depicted in FIG. 13, the structural members 1302 may include any variety of shapes. In FIG. 13, the structural members include a circular portion 1306 and a base portion 1308. The structural members 1302 may form any desired shape and may be designed to enhance the aesthetic value of the storage system 1300 while maintaining the functionality and versatility of the storage system 1300. For example, one or more objects may be stored on the left side (as oriented) and one or more additional objects may be stored on the right side (as oriented) of the versatile storage system 1300.

EXAMPLES

The following examples pertain to further embodiments.

Example 1 is a storage system that includes a plurality of structural members spaced apart in a substantially parallel orientation. The system further includes a plurality of flexible cords, wherein each of the flexible cords is attached to at least two of the structural members at an angle that is substantially normal with the structural members. The structural members are configured to hold the flexible cords taut such that an object may be woven through the flexible cords and secured therein.

In Example 2, the structural member in the storage system in Example 1 is telescoping such that a user may adjust the length of the structural member.

In Example 3, the system of Example 1 further includes a hole in the structural member. The hole is configured to receive a flexible cord.

In Example 4, the system in Example 1 includes an attachment component attached to an end of the flexible cords. The attachment component is configured to secure the flexible cord to the structural member.

In Example 5, the attachment component in Example 4 includes a rigid rod attached to the end of the flexible cord at an angle substantially normal to the flexible cord. The attachment component is configured to pass through the hole and secure the flexible cord to the structural member at the hole.

In Example 6, the system in Example 1 further includes an end-to-end attachment component attached to at least one of the flexible cords. The end-to-end attachment component is configured to attach a first end of the flexible cord to a second end of the flexible cord.

In Example 7, the end-to-end attachment component in Example 6 includes a loop attached to a first end of the flexible cord and a hook attached to a second end of the flexible cord. The hook may connect with the loop and hold the flexible cord in a continuous circle arrangement.

In Example 8, the flexible cords in Example 1 are removably attached to the structural members.

In Example 9, the system in Example 1 includes at least one structural member that is mounted in a fixed location.

In Example 10, the system in Example 1 further includes a mounting component attached to at least one of the structural members and configured to securely hold the structural member. The system further includes a position-adjusting component attached to the mounting component and configured to adjust a position of the storage system.

In Example 11, the position-adjusting component in Example 10 is configured to adjust a position of a structural member relative to an additional structural member such that the distance between the structural members is adjusted.

In Example 12, the position-adjusting component in Example 10 is configured to adjust an angle of a structural member relative to the mounting component.

In Example 13, the structural members in Example 1 are constructed of a rigid material.

In Example 14, the structural members in Example 1 form a substantially flat and rectangular shape.

In Example 15, the structural members in Example 1 are constructed of a rigid plastic.

In Example 16, the storage system in Example 1 is attached to an automotive vehicle.

In Example 17, a storage system includes a plurality of structural members spaced in a substantially parallel orientation. The system further includes a plurality of holes within the structural members. The system further includes a plurality of flexible cords, wherein each flexible cord includes an attachment component and the attachment component is configured to removably attach the flexible cord to the structural member at the hole. The structural members are configured to hold the flexible cords taut such that an object may be woven through the flexible cords and secured therein.

In Example 18, a storage system for an automotive vehicle includes a mounting component attached to a vehicle. The system further includes a pair of opposing structural members attached to the mounting component and spaced apart in a substantially parallel orientation. The system further includes a plurality of flexible cords, wherein each of the flexible cords is attached to the pair of structural members at an angle substantially normal with the structural members. The system further includes a position-adjusting component attached to the mounting component and configured to adjust a position of at least one of the structural members. The mounting component is configured to hold the pair of structural members sufficiently far apart such that the plurality of flexible cords is held substantially taut. The system is configured such that an object may be woven through the plurality of flexible cords and stored securely therein.

In Example 19, the flexible cords in the system of Example 18 are removably attached to at least one of the structural members.

In Example 20, the system in Example 18 further includes a plurality of holes within the structural members and the holes are configured to receive a flexible cord.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations might be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

The invention claimed is:

1. A storage system comprising:
   a plurality of structural members spaced in a substantially parallel orientation; and
   a plurality of flexible cords, wherein each of the flexible cords is attached to at least two structural members of the plurality of the structural members at a first angle substantially normal with the at least two structural members;
   a mounting component attached to a first structural member of the plurality of structural members and configured to securely hold the first structural member; and
   a position-adjusting component attached to the mounting component and configured to adjust a position of the storage system, wherein the position-adjusting component comprises a pivot component, an arm coupled to the pivot component, and an angle-adjustment component coupled to the arm,
   wherein the plurality of structural members are configured to hold the flexible cords taut such that an object may be woven through the plurality of flexible cords and secured therein,
   wherein a first flexible cord of the flexible cords further comprises an end-to-end attachment component, the end-to-end attachment component comprising a first component attached to a first end of the first flexible cord, and a second component attached to a second end of the first flexible cord, wherein the first component locks the second component to hold the first flexible cord in a continuous circular configuration through the plurality of structural members, and
   wherein the first component comprises a loop attached to the first end of the first flexible cord, and wherein the second component comprises a hook attached to the second end of the first flexible cord.

2. The system of claim 1, wherein at least one structural member of the plurality of structural members further comprises a plurality of holes, and wherein the at least one structural member is telescoping such that a length of the at least one structural member may be adjusted.

3. The system of claim 1, wherein at least one of the structural members further comprises a hole configured to receive the first flexible cord.

4. The system of claim 1, wherein the end-to-end attachment component is configured to secure the each of the flexible cords to the at least two structural members.

5. The system of claim 1, wherein at least one of the plurality of flexible cords is removably attached to the at least two structural members.

6. The system of claim 1, wherein at least one of the at least two structural members is mounted in a fixed location.

7. The system of claim 1, wherein the position-adjusting component adjusts a distance between the first structural member and a second structural member of the plurality of structural members based on a size and shape of the object.

8. The system of claim 1, wherein the position-adjusting component is configured to adjust a third angle of the first structural member relative to the mounting component.

9. The system of claim 1, wherein the plurality of structural members are constructed of a rigid material.

10. The system of claim 1, wherein the plurality of structural members comprise a substantially flat and rectangular shape.

11. The system of claim 1, wherein the plurality of structural members are constructed of a rigid plastic.

12. The system of claim 1, wherein the storage system is attached to an automotive vehicle.

13. A storage system comprising:
   a plurality of structural members spaced in a substantially parallel orientation;
   a plurality of holes within the plurality of structural members;
   a plurality of flexible cords, wherein each flexible cord comprises an attachment component and the attachment component is configured to removably attach the flexible cord to a structural member at a hole of the plurality of holes;
   a mounting component attached to a first structural member of the plurality of structural members and configured to securely hold the first structural member; and
   a position-adjusting component attached to the mounting component and configured to adjust a position of the storage system, wherein the position-adjusting component comprises a pivot component, an arm coupled to the pivot component, and an angle-adjustment component coupled to the arm,
   wherein the plurality of structural members are configured to hold the plurality of flexible cords taut such that an object may be woven through the plurality of flexible cords and secured therein,
   wherein a first flexible cord of the flexible cords further comprises an end-to-end attachment component, the end-to-end attachment component comprising a first component attached to a first end of the first flexible cord, and a second component attached to a second end of the first flexible cord, wherein the first component locks the second component to hold the first flexible cord in a continuous circular configuration through the plurality of structural members,
   wherein the first component comprises a loop attached to the first end of the first flexible cord, and wherein the second component comprises a hook attached to the second end of the first flexible cord.

14. A storage system for an automotive vehicle comprising:
- a mounting component attached to a vehicle;
- a pair of opposing structural members attached to the mounting component and spaced apart in a substantially parallel orientation;
- a plurality of flexible cords, wherein each of the plurality of flexible cords is attached to the pair of opposing structural members at an angle substantially normal with the pair of opposing structural members; and
- a position-adjusting component attached to the mounting component and configured to adjust a position of a first structural member of the pair of opposing structural members, wherein the position-adjusting component comprises a pivot component, an arm coupled to the pivot component, and an angle-adjustment component coupled to the arm;
- wherein the mounting component is configured to hold the pair of opposing structural members apart such that the plurality of flexible cords are substantially taut;
- wherein an object may be woven through the plurality of flexible cords and stored securely therein;
- wherein a first flexible cord of the flexible cords further comprises an end-to-end attachment component, the end-to-end attachment component comprising a first component attached to a first end of the first flexible cord, and a second component attached to a second end of the first flexible cord, wherein the first component locks the second component to hold the first flexible cord in a continuous circular configuration through the pair of opposing structural members,
- wherein the first component comprises a loop attached to the first end of the first flexible cord, and wherein the second component comprises a hook attached to the second end of the first flexible cord.

15. The system of claim 14, wherein each of the plurality of flexible cords is removably attached to at least one of the pair of opposing structural members.

16. The system of claim 14, further comprising a plurality of holes within the pair of opposing structural members and wherein the holes are configured to receive the first flexible cord.

* * * * *